United States Patent Office 2,850,329
Patented Sept. 2, 1958

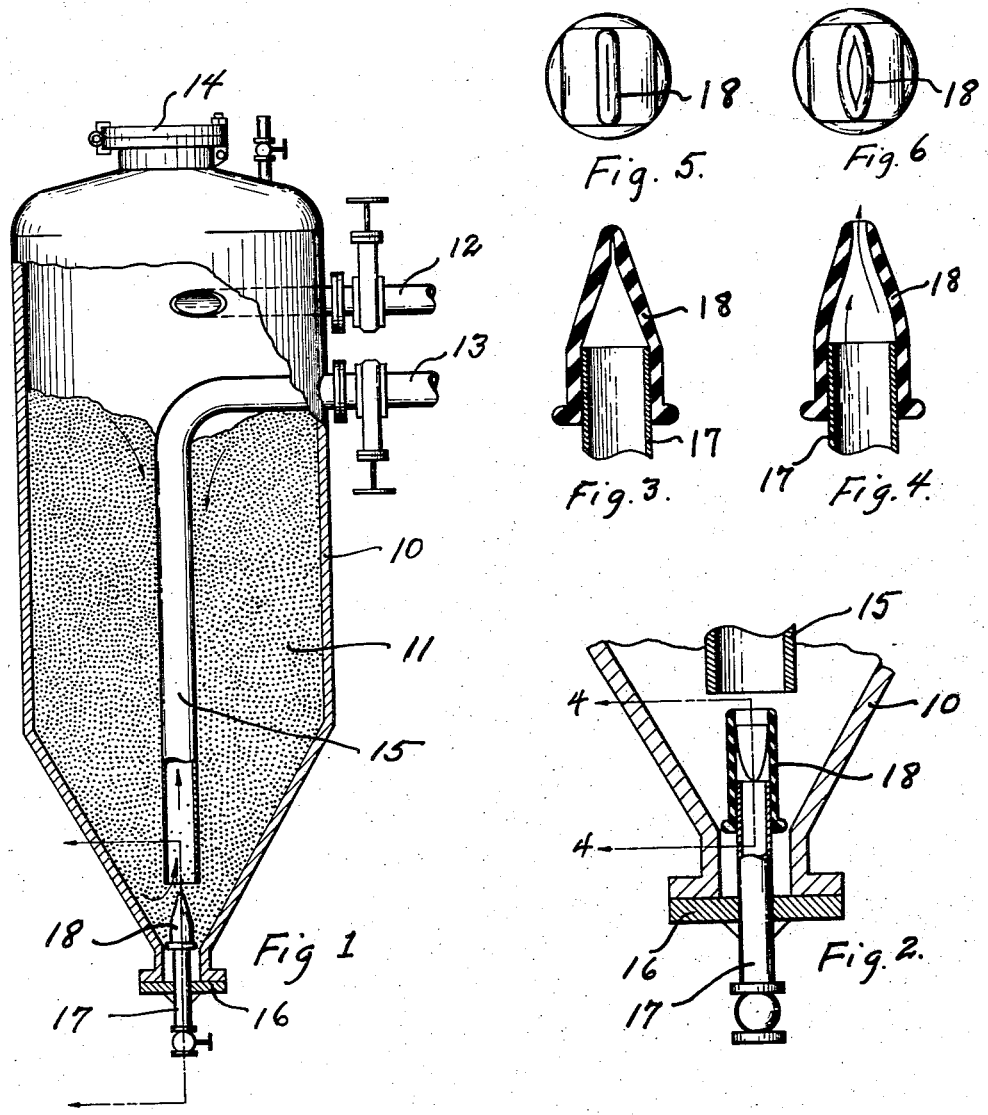

2,850,329
PNEUMATICALLY OPERATED SYSTEM

Edwin C. Pyle and Samuel S. Northington, Duncan, Okla., assignors to Halliburton Oil Well Cementing Company, Duncan Okla.

Application October 1, 1956, Serial No. 613,229

1 Claim. (Cl. 302—53)

This invention relates to pneumatic conveying systems and more particularly to a pneumatically operated system for conveying pulverulent material such as Portland cement or other finely divided or pulverized products used as admixes with Portland cement.

It is now common practice in the oil fields and in other places where large volumes of cement are stored and used in bulk to employ air or other gas to convey the cement from one place to another or to blend the cement with other finely divided material. When fluffed up with the gas, these materials flow in a manner quite similar to the action of liquids.

Problems arise in the pneumatic conveying of such materials, however, especially where the air is intermittently supplied thereto. The material is apt to settle and pack into a dense mass when the air is turned off and the system not used for a period of time, and this mass cannot readily be moved later when the air comes on again. This condition most frequently arises in the vicinity of small conduits which are used to admit air into a vessel. Of course, if one part of a pneumatic system goes out of operation, the whole system has to be shut down, resulting in considerable expense and delay in locating and remedying the difficulty.

In accordance with the present invention, a pneumatic conveying tank is provided with a specially designed flexible jet structure located in the bottom of the tank and properly spaced below the discharge conduit of the tank. Air is supplied to the flexible jet to fluff the pulverulent material therein and cause it to flow out through the discharge conduit. The arrangement is remarkably free from difficulties caused by packing of the material around the discharge conduit, and the shutting down of the system due to this condition is largely eliminated.

The objects of the invention will be apparent from the following description taken in connection with the accompanying drawing in which:

Fig. 1 is a view in vertical cross section of a pneumatic conveying tank constructed in accordance with the invention;

Fig. 2 is an enlarged vertical cross-sectional view of a segment of the tank of Fig. 1;

Fig. 3 is a vertical cross-sectional view of the flexible jet structure of Figs. 1 and 2 and showing the same in a collapsed or closed position;

Fig. 4 is a vertical cross-sectional view of the jet structure of Fig. 3, showing the same in an open position;

Fig. 5 is a plan view from above of the jet when it is in the position shown in Fig. 3; and Fig. 6 is a plan view from above of the jet when it is in the position shown in Fig. 4.

Referring to the drawing, it will be seen that a metal tank 10 is there illustrated as having a cone-shaped bottom or hopper. The tank may contain pulverulent material as illustrated at 11 and this material may have been supplied thereto through pneumatic conveying conduit 12 or through a lid 14.

The purpose of the tank 10 is to receive the material from some other part of the pneumatic conveying system or from some apparatus for blending admixes with it and adding a fluffing action and pneumatic propelling force to it. To accomplish this, a pneumatic discharge conduit 13 is connected to a large vertical pipe 15 centrally located within the tank 10 and extending down into the hopper thereof.

The bottom of the hopper of the tank 10 is provided with a bottom plate 16, and extending through this plate is an air supply pipe 17.

An important feature of the invention is the flexible jet structure 18 mounted on the air inlet pipe 17 and so located as to discharge air, with a jetting action, into the lower end of the larger pipe 15.

The details of the flexible jet structure 18, and its action, are illustrated in Figs. 2 to 6.

The structure 18 is made of rubber, neoprene or the like and is so molded, in its manufacture, as to normally be in a collapsed or closed position as illustrated in Figs. 3 and 5. In this position of the structure 18, the air supply pipe 17 is not only closed but the structure 18 is in a position to compress or move a small portion of the material 11 laterally when the air pressure in the pipe 17 reaches a sufficiently high value. In the collapsed position shown in Figs. 3 and 5, it will be seen that the walls of the structure 18 are located in two planes which intersect at the top thereof, the shape then being like that of a tent.

As the structure 18 opens under the influence of the air pressure, it assumes the shape shown in Figs. 4 and 6, initially, so as to exert a wedging action on the material 11 in two directions. As the material 11 then continues to fluff and travel into the large pipe 15, the structure 18 then expands on out into a more nearly circular or cylindrical shape such as indicated in Fig. 2, although ordinarily not completely becoming circular in cross section at its upper end. The discharge pattern of the air blast from the structure 18 is such, however, as to cause the material to aspirate and flow rapidly into the conduit 15.

While only one embodiment of the invention is shown and described herein, it is obvious that changes may be made without departing from the spirit of the invention.

The annexed claim is intended to cover the structure shown and equivalents thereof.

We claim:

A pneumatically operated system for fluffing and imparting propelling force to pulverulent material comprising a tank having a cone-shaped bottom or hopper, a large discharge pipe mounted vertically in the tank with its lower end in said hopper, a gas supply pipe extending through the bottom of said hopper and a flexible jet structure of molded material mounted on said gas supply pipe, the arrangement of gas supply pipe and flexible jet structure being such that a blast of gas may be discharged from the jet structure with a jetting action directly into said large discharge pipe and said jet structure being so molded as to collapse, when no gas pressure is supplied thereto, with the walls thereof in two planes intersecting at the top thereof, and being such as to exert a lateral compressing force upon pulverulent material in the tank when gas pressure is supplied thereto.

References Cited in the file of this patent

UNITED STATES PATENTS

| 1,364,532 | Von Porat | Jan. 4, 1921 |
| 1,422,105 | Kirby | July 11, 1922 |
| 1,749,817 | Hermsdorf | Mar. 11, 1930 |
| 2,594,525 | Walden | Apr. 29, 1952 |
| 2,598,002 | Langdon | May 27, 1952 |
| 2,673,764 | Cummings | Mar. 30, 1954 |

FOREIGN PATENTS

| 1,074,419 | France | Mar. 31, 1954 |